(12) United States Patent
Dey et al.

(10) Patent No.: US 9,185,680 B2
(45) Date of Patent: *Nov. 10, 2015

(54) CONTEXTUAL PUSH NOTIFICATION SERVICE

(71) Applicant: International Business Machines Corporation, Armonk, NY (US)

(72) Inventors: Kuntal Dey, New Delhi (IN); Girish Dhanakshirur, Bangalore (IN); Jayakarthik Jayabalan, Chennai (IN); Sumit Mittal, Uttar Pradesh (IN); Sougata Mukherjea, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/133,714

(22) Filed: Dec. 19, 2013

(65) Prior Publication Data

US 2015/0181556 A1 Jun. 25, 2015

(51) Int. Cl.
*H04W 4/00* (2009.01)
*H04W 68/00* (2009.01)
*H04L 29/06* (2006.01)
*H04W 4/12* (2009.01)
*H04W 68/02* (2009.01)

(52) U.S. Cl.
CPC ......... *H04W 68/005* (2013.01); *H04L 65/4061* (2013.01); *H04W 4/12* (2013.01); *H04W 68/02* (2013.01)

(58) Field of Classification Search
CPC ......... H04L 67/26; H04L 67/06; H04L 67/10; H04L 51/046; H04L 41/50; H04L 67/02; H04L 67/04; H04L 65/4061; H04W 4/12; H04W 4/16; H04W 4/02; H04W 4/14; H04W 76/005; H04W 68/00; H04W 68/02; H04W 68/005; G06Q 50/01; H04N 21/262

See application file for complete search history.

(56) References Cited

U.S. PATENT DOCUMENTS

| 7,243,130 | B2 * | 7/2007 | Horvitz et al. ................ 709/207 |
| 8,032,409 | B1 * | 10/2011 | Mikurak .................... 705/14.39 |
| 8,326,630 | B2 | 12/2012 | Chandrasekar et al. |
| 8,452,266 | B2 | 5/2013 | Chiu et al. |
| 8,589,495 | B1 * | 11/2013 | Beckert ........................ 709/206 |
| 2002/0116472 | A1 * | 8/2002 | Kalish et al. .................. 709/218 |
| 2003/0131142 | A1 * | 7/2003 | Horvitz et al. ................ 709/313 |
| 2007/0214245 | A1 | 9/2007 | Hamalainen et al. |

(Continued)

FOREIGN PATENT DOCUMENTS

| WO | 2008102265 A2 | 8/2008 |
| WO | 2009017712 A1 | 2/2009 |

(Continued)

OTHER PUBLICATIONS

Dey et al, "Contextual Push Notification Service," U.S. Appl. No. 14/312,741, filed Jun. 24, 2014, 29 pages.

*Primary Examiner* — Ajit Patel
(74) *Attorney, Agent, or Firm* — Teddi Maranzano; Robert Straight

(57) ABSTRACT

A contextual push notification service is provided, including: receiving, by a mobile device, a notification message. The notification message comprises at least one context rule and a notification message. The at least one context rule is compared, on the mobile device, with at least one user context preference. Based on the results of the comparison, a notification action is taken.

12 Claims, 4 Drawing Sheets

(56) References Cited

U.S. PATENT DOCUMENTS

| | | |
|---|---|---|
| 2008/0112321 A1* | 5/2008 | Ricketts .................... 370/235 |
| 2009/0117881 A1* | 5/2009 | Deshpande ................ 455/414.1 |
| 2009/0292762 A1* | 11/2009 | Mettala et al. ................ 709/203 |
| 2010/0042470 A1 | 2/2010 | Chang et al. |
| 2010/0049702 A1 | 2/2010 | Martinez et al. |
| 2010/0180001 A1 | 7/2010 | Hardt |
| 2010/0281169 A1* | 11/2010 | Charles ...................... 709/227 |
| 2011/0014972 A1* | 1/2011 | Herrmann et al. ............ 463/25 |
| 2011/0167105 A1* | 7/2011 | Ramakrishnan et al. ..... 709/203 |
| 2012/0158472 A1* | 6/2012 | Singh et al. ................ 705/14.4 |
| 2012/0307656 A1* | 12/2012 | Vyrros et al. ................ 370/252 |
| 2012/0322470 A1* | 12/2012 | Said et al. .................... 455/466 |
| 2013/0073995 A1 | 3/2013 | Piantino et al. |
| 2013/0246504 A1* | 9/2013 | Hu et al. ..................... 709/203 |
| 2014/0123157 A1* | 5/2014 | Keskitalo et al. ............ 719/328 |
| 2014/0156785 A1* | 6/2014 | Kammula et al. ............ 709/217 |
| 2014/0172973 A1* | 6/2014 | Zadorozny et al. .......... 709/204 |
| 2014/0278860 A1* | 9/2014 | Lee et al. .................... 705/14.16 |

FOREIGN PATENT DOCUMENTS

| | | |
|---|---|---|
| WO | 2009049300 A1 | 4/2009 |
| WO | 2012087472 A1 | 6/2012 |

* cited by examiner

CONTEXTUAL PUSH NOTIFICATION SERVICE

FIELD

The present disclosure relates generally to wireless data communications, and more particularly, to a contextual push notification service.

BACKGROUND

Several options are open to an enterprise that may want to reach a potential audience with news of events that may be interesting, such as for example, a sale or a meeting notice. Some popular options include email, text message (SMS), or an ad within a web browser window. Such notifications are server-based broadcasts. Some, such as those delivered within a web browser window, rely on being discovered by chance by the potential audience. Consequently, some in the potential audience may be overburdened by repeated or unwanted notifications, while others may not want to receive notifications at all. The popularity of mobile devices, such as smart phones and tablets, is increasingly influencing the way content generators, such as a business advertiser or other enterprise, reach out to potential consumers of their content. For example, an advertiser may publish its content for all potential platforms in an attempt to capture as much of the potential audience as possible. Additionally, the advertiser may increase how frequently the advertisement is modified so that it becomes more appealing to the potential audience. This flexibility in generating the content may enable an advertiser to reach a larger audience in a more timely manner, and at a more cost effective price point in comparison to more traditional methods, such as print. On the other hand, a mobile device user may be interested in receiving some content, but may easily become overwhelmed and irritated by its frequency and volume. Where a balance between the interests of an advertiser and a consumer may be reached, both may benefit.

BRIEF SUMMARY

Among other things, a contextual push notification service is provided. According to an embodiment of the invention, a contextual push notification service comprises: receiving, by a mobile device, a notification message comprising at least one context rule; and a notification message. The received at least one context rule is compared, at the mobile device, with at least one user context preference. A notification action is taken, at the mobile device, based on the comparing of the received at least one context rule with the at least one user context preference.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
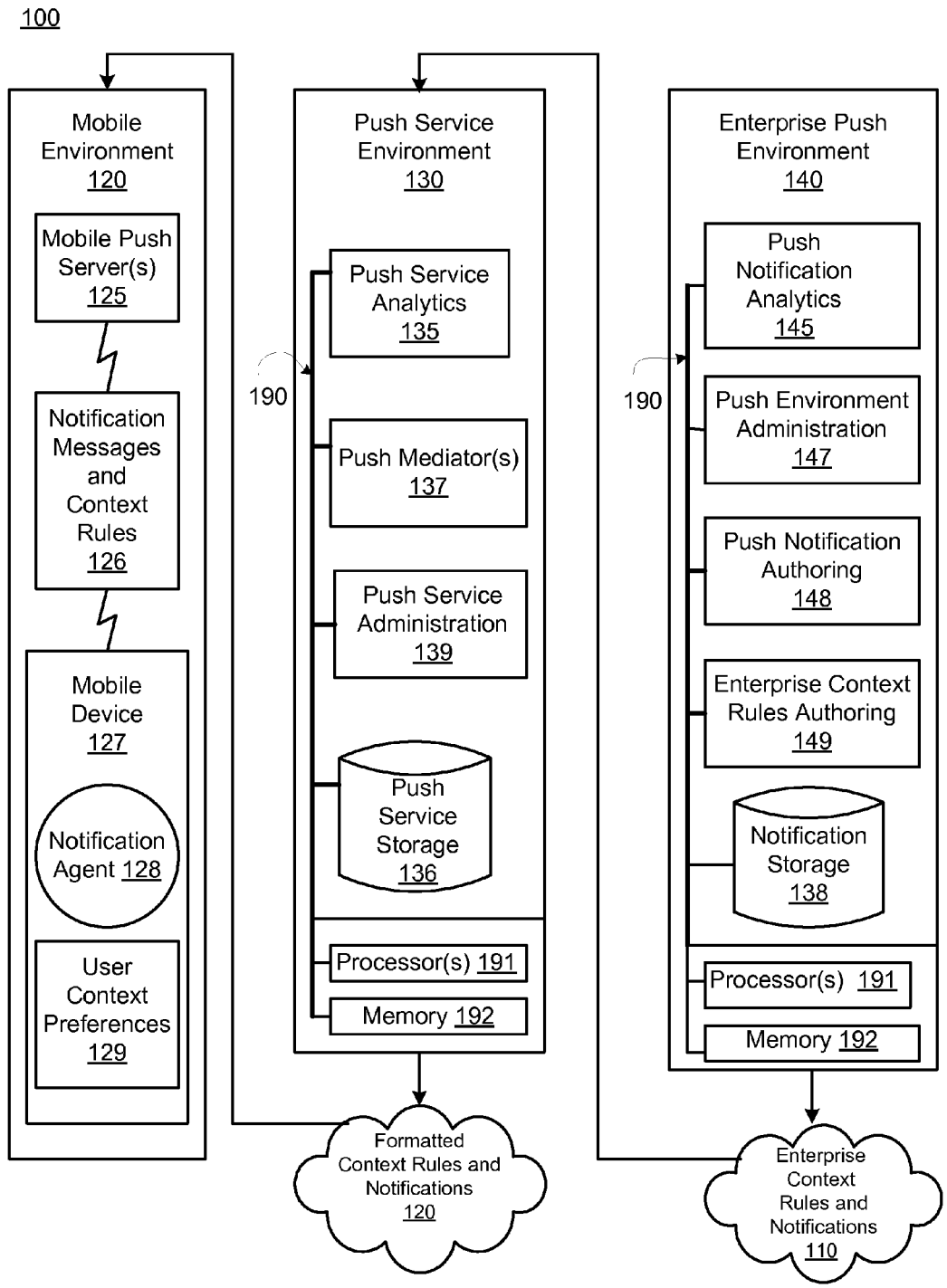
FIG. 1 is a block diagram illustrating an exemplary embodiment of a system for a contextual push notification service.
Figure 2:
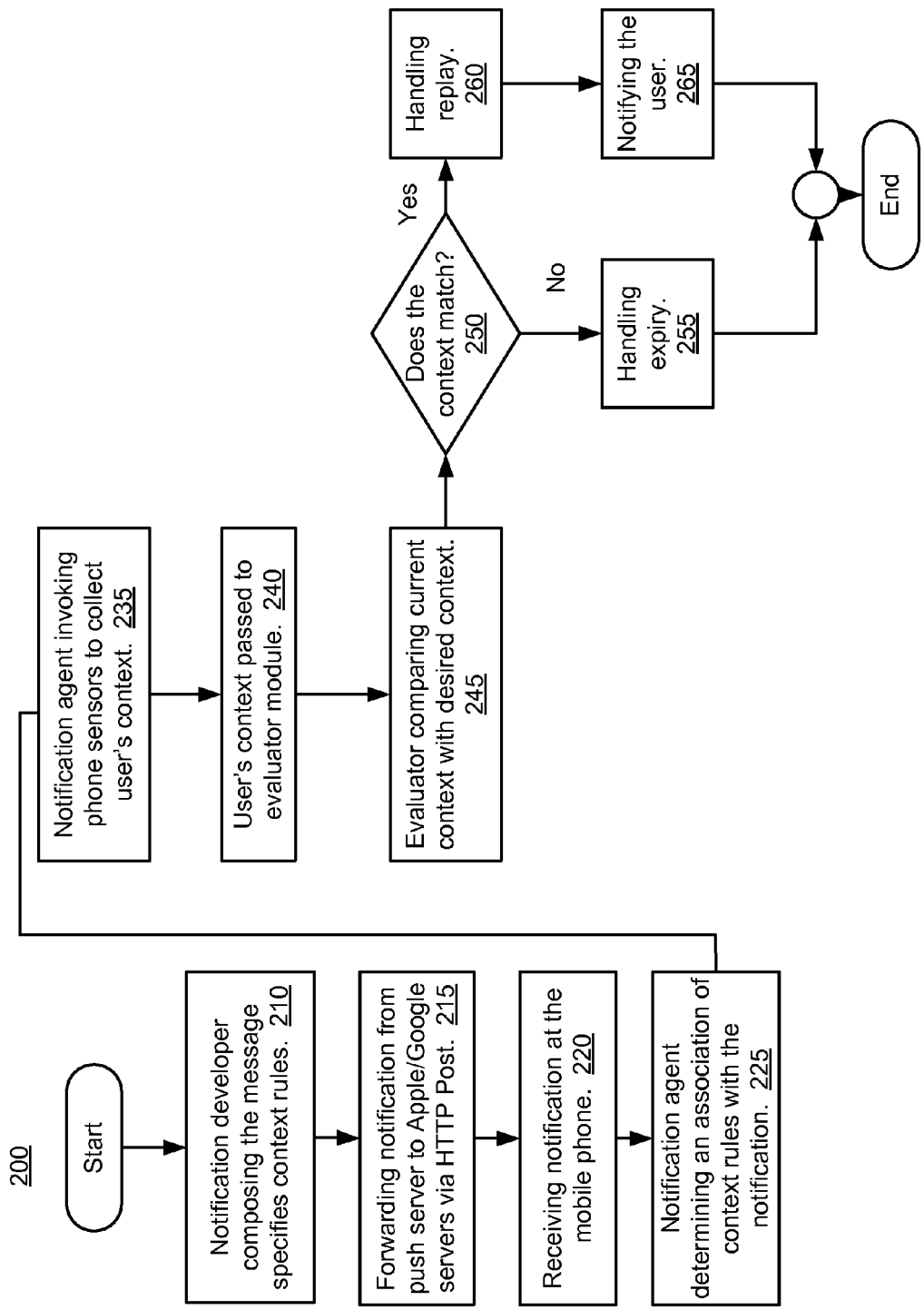
FIG. 2 is a flow diagram illustrating an exemplary embodiment of a method for a contextual push notification service.

Embodiments of the present invention will now be described with reference to the figures. Referring to FIGS. 1-2, a contextual push notification service system 100 and method 200 provide an exemplary implementation for a contextual push notification service.

FIG. 1 is a block diagram of an exemplary embodiment of a system 100 for a contextual push notification service. The system 100 consists of at least the enterprise push environment 140 and the mobile environment 120. The push service environment 130 may be incorporated within the enterprise push environment 140, where the enterprise performs both the functions of authoring notification messages and managing the formatting and delivery of the notification messages to the target mobile devices 127 on the various subscriber networks. The enterprise push environment 140 includes a push notification authoring 148 environment from which a developer may compose push notification messages. The push notification authoring 148 environment may be a workstation or another input device configured with software development tools suitable for authoring push notifications, such as JavaPNS, PHP, and JSON.

The enterprise push environment 140 also includes an enterprise context rules authoring environment 149, where the developer may create a set of context rules that may further segment the subscribers in an application's provisioning profile by one or more criteria. The list of subscribers who have installed an application and have registered to receive messages from the application may be referred to as the application's provisioning profile. The push environment administration 147 may be a workstation configured for the administration and operation of the enterprise push environment 140, such as performance monitoring, software updates, and user management. The push notification analytics 145 environment may be configured to receive feedback results including a count of notification messages that were sent, along with a count of how many notifications that subscribers chose to receive, or to ignore. By applying statistical and other analytics, the efficiency of notification messages may be measured and improved. The enterprise push environment 140 may also include notification storage 138 where application provisioning profiles, subscriber lists, notification message templates, and analytical data may be stored. The notification storage 138 may be a persistent storage device. Although shown as a single unit, the notification storage 138 may be a combination of fixed and/or removable storage devices, such as fixed disc drives, Storage Area Network (SAN), solid state drives, floppy disc drives, tape drives, removable memory cards or optical storage. The functions of the various components in the enterprise push notification environment 140 may be performed by multiple software modules within a computer, or multiple dedicated computers. Where the enterprise push notification environment 140 is implemented in multiple software modules, 190 represents a bus over which communication among the software modules takes place. The multiple software modules share the host computer resources, such as the processor(s) 191, memory 192, and notification storage 138.

Where the enterprise push notification environment 140 is implemented in multiple dedicated computers, 190 represents a network over which the computers communicate. In that embodiment, the processor(s) 191, memory 192, and notification storage 138 are illustrative of these components as they are installed in each of the dedicated computers. In either embodiment, computers participating in the enterprise push notification environment 140 are under the control of an operating system (not shown). Enterprise context rules and notifications 110 are output from the enterprise push notification environment 140 and transmitted to the push service environment 130 through a well-known network, such as LAN, WAN, or internet.

The push service environment 130 includes push service administration 139, which may be a workstation configured for the administration and operation of the push service environment 130, such as performance monitoring, software updates, and user management. The push service analytics 135 environment may be configured to receive feedback results from the mobile environment 120, including a count of notification messages that were sent, along with a count of how many notifications that subscribers chose to receive or to ignore. These feedback results may be transmitted back to the enterprise push environment 140 over a well-known network (not shown) for processing, for example, by the push notification analytics 145 environment. The push service environment 130 also includes at least one push mediator 137, which is a client interface between the push service environment 130 and the corresponding subscriber network, such as Apple Push Notification Service® (APNS). The push service storage 136 provides storage, for example, for application provisioning profiles, subscriber lists, pending notification messages and their delivery schedules, and analytical data. The push service storage 136 may be a persistent storage device, a combination of fixed and/or removable storage devices, such as fixed disc drives, Storage Area Network (SAN), solid state drives, floppy disc drives, tape drives, removable memory cards or optical storage. As in the enterprise push environment 140, the functions of the various components in the push service environment 130 may be performed by multiple software modules within a computer, communicating with each other over a bus 190 and exploiting the processor(s) 191, memory 192, and push service storage 136 of the host computer. Where the push service environment 140 is implemented in multiple dedicated computers, 190 represents a network over which the computers communicate. In that embodiment, each dedicated computer includes the processor(s) 191, which is representative of a single CPU, multiple CPUs, a single CPU having multiple processing cores, and the like, and one or more memory modules 192. Notification messages and context rules 120 formatted for the protocol of a particular subscriber network are transmitted via well-known network to the mobile push server(s) 125 in the mobile environment 120.

The mobile environment 120 includes the mobile push server 125 corresponding to a subscriber network, such as the APNS. The mobile push server 125 transmits the notification messages and context rules 126 via satellite over its subscriber cell service network to one or more target mobile devices 127. A mobile device comprises a smart phone, tablet computer, and personal digital assistant (PDA). In general, a mobile device is a device that is configured to run a mobile application (mobile app). The target mobile device 127 contains a notification agent 128, which may be implemented for example, as a software agent, firmware and a device driver.

The target mobile device 127 also stores user context preferences 129, which the subscriber may input and modify for each installed application, and which may be applied to each received notification message.

The particular description in FIG. 1 is for illustrative purposes only; it should be understood that the invention is not limited to specific described embodiments, and any combination is contemplated to implement and practice the invention.

Referring now to FIG. 2, an exemplary embodiment 200 of a contextual push notification service is illustrated. A push notification is a technique that may be used by an application owner, such as a business enterprise, to alert a mobile device user who has subscribed to the application that information is waiting to be viewed. Exemplary information may include a message, a calendar event, or data such as an update to the app. At 210 a developer, i.e., author, may compose a push notification message using a workstation or a push notification authoring environment 148 (FIG. 1), or another input device configured with software development tools suitable for authoring push notifications. Such exemplary development tools include, JavaPNS, PHP, and JSON. In addition to the push notification message, the developer, using an authoring environment such as 149 (FIG. 1), authors a set of context rules that may further segment the subscribers in an application's provisioning profile by one or more criteria. In general, a context rule captures a contextual condition under which a notification may become meaningful to the developer or to the subscriber. When referred to in the context of the developer, a context rule describes a condition that makes the delivery of the notification message meaningful to the developer. For example, a business enterprise may specify that a notification message that announces a sale should be sent to subscribers on a certain day, or when a subscriber is physically near the retail store. Context rules can go beyond location as a context, for example, pertaining to a locomotive state (walking/sitting/loitering) of the user. However, a subscriber may also define one or more context rules, in this case to describe, for example, times when the subscriber should not be interrupted by notification messages. The subscriber's context rules may also be referred to as local context rules, user context rules, or user context preferences.

After the notification developer composes them, the notification message and the associated context rules may be forwarded to an intermediary service, such as the push service environment 130 (FIG. 1). The push service environment 130 (FIG. 1) contains one or more agents, referred to as push mediators 137 (FIG. 1), each one corresponding to the protocol of a target server, such as Apple Push Notification Service® (APNS) and Google Cloud Messaging for Android® (GCM). Since the push service provides a push mediator for each target, in-depth knowledge of each target server's protocol by the notification developer is not needed to properly author and format a version of the notification message for each target.

The push service may, on behalf of the developer, manage subscriber lists, notification message storage, and the scheduling and delivery of the notification message according to its associated context rules. Additional services may include gathering and sending the results of one or more notification messages to the developer. Such results may include a count of notification messages that were sent, along with a count of how many notifications the subscribers chose to receive, or to ignore.

In another embodiment, the developer may forward the notification message and the associated context rules directly to the server of one or more providers. However, specialized knowledge of each target server's protocol would be needed to properly author and format a version of the notification message for each target, increasing the potential for errors.

At 215, the push service uses a communication protocol, such as for example Hypertext Transfer Protocol (HTTP) or Transmission Control Protocol (TCP) to forward the notification message and associated context rules to the mobile push server 125 (FIG. 1) of one or more subscriber networks, such as Apple Push Notification Service® (APNS) and Google Cloud Messaging for Android® (GCM). HTTP is a well-known stateless application-layer protocol for communicating between distributed systems, particularly web-based hosts and clients. TCP is a well-known communications protocol that provides reliable, ordered, delivery of data over a network.

At 220, the mobile push server 125 (FIG. 1) in the mobile environment 120 (FIG. 1) dispatches the notification message to the target mobile devices 127 (FIG. 1) that were specified by the notification developer. A mobile device become eligible as a target when a mobile subscriber installs and registers an application, resulting in the mobile device being added to the application's provisioning profile. Since the push service maintains multiple push mediators 137 (FIG. 1), the notification message and context rules may be dispatched to more than one subscriber network according to the notification developer's desired delivery schedule.

Figure 3:
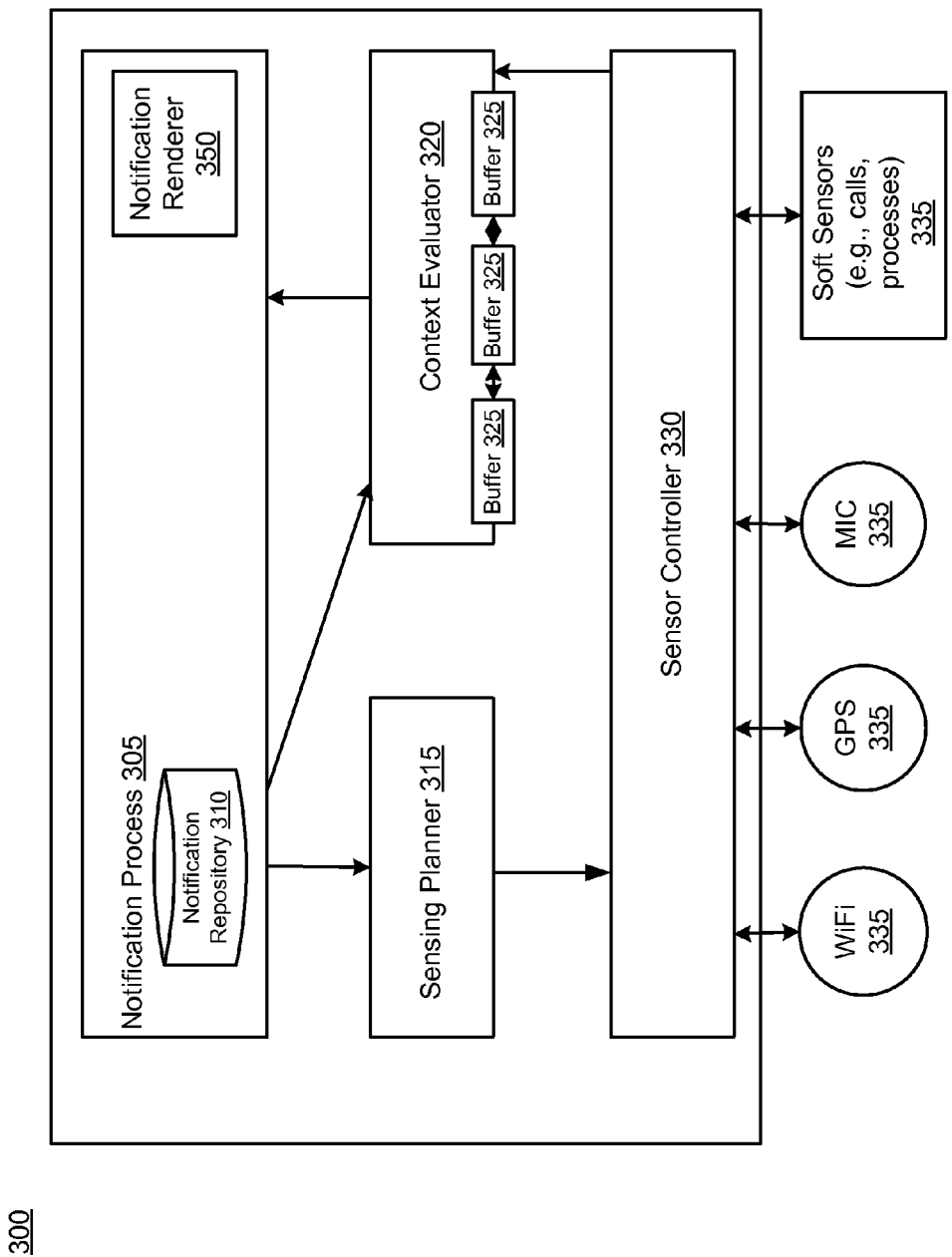
FIG. 3 is a block diagram of an architecture of a client agent on a mobile device, according to an exemplary embodiment of the method of FIG. 2.

300 (FIG. 3) depicts a detail representation of the notification agent that is shown generally as the notification agent 128 in FIG. 1. References to the notification agent in the following discussion will be made using notification agent 300 (FIG. 3). At 225 the notification message is received at the target mobile device 127 (FIG. 1) by a notification agent 300 (FIG. 3) that is installed on the target mobile device 127 (FIG. 1). The notification process 305 (FIG. 3) may evaluate the received notification message to determine which of the context rules that are associated with the message should receive further analysis for comparison against the real-time contextual condition, or context, of the target mobile device 127 (FIG. 1). In another embodiment, the notification process 305 (FIG. 3) may query the push service server to retrieve the associated context rules. However the context rules are obtained, the notification process 305 (FIG. 3) examines the context rules to determine what types of data should be gathered by the target mobile device's sensors 335 (FIG. 3). The gathered sensor data may be input to the context evaluator 320 (FIG. 3) to computationally determine the real-time contextual condition of the target mobile device 127 (FIG. 1). The notification process 305 (FIG. 3) also retrieves the user's context rules from local storage on the target mobile device 127 (FIG. 1), such as for example, the notification repository 310 (FIG. 3).

A context rule may be defined over multiple sensors 335 (FIG. 3) on the target mobile device 127 (FIG. 1), for example a GPS location in combination with a proximity to a WiFi access point. Based on the results of analyzing the context rules, at 235 the notification process 305 (FIG. 3) communicates with the sensing planner 315 (FIG. 3) to request that the sensor controller 330 (FIG. 3) activate and poll one or more sensors 335 (FIG. 3) on the target mobile device 127 (FIG. 1). A duration to gather the sensor data may also be communicated from the sensing planner 315 (FIG. 3) through the sensing controller 330 (FIG. 3) to each activated sensor 335 (FIG. 3). A different duration may be communicated to each activated sensor 335 (FIG. 3). The sensor data that is collected through the sensor controller 330 (FIG. 3) may be gathered in one or more buffers 325 (FIG. 3) pending further processing in the context evaluator 320 (FIG. 3). Computations may be performed on the gathered sensor data to determine whether the contextual condition of the target mobile device 127 (FIG. 1) satisfies a context rule that was associated with the notification message. A contextual condition may be represented as a mathematical expression that evaluates inputted sensor data to determine whether the sensor data equates to a known attribute. An attribute may be raw data or a function within the notification agent 300 (FIG. 3) and stored locally, for example in the notification repository 310 (FIG. 3). For example, an attribute may include a function that receives data from an accelerometer sensor and, based upon calculations, evaluates that the data resolves to the action of walking.

At 240, the context preferences that the target mobile device user defined and stored on the target mobile device 127 (FIG. 1) are extracted, for example, from the notification repository 310 (FIG. 3), and passed to the context evaluator 320 (FIG. 3). These context preferences may be referred to as local context rules, user context rules, or user context preferences. For example, a user may define a user context preference that between certain times of the day, notification messages should not be presented to the user. Similarly, if the user is in a certain shopping center, present notification messages, such as coupons, from any store in the shopping center. The user may also set a preference for how many times to replay a notification message before expiring it. Other user context preferences include social status (i.e., with friends, with family, alone), current activity (i.e., walking, jogging, in a meeting), and the time of day.

At 245, following computations on the gathered sensor data, the context evaluator 320 (FIG. 3) further compares the context rules that match the contextual condition (i.e., successful context rules) against the user context preferences. Note that the comparison of the context rules with the contextual condition is performed on the mobile device, rather than requiring that the user's context be transmitted to the server for the comparison to take place there. This not only contributes to protecting the user's privacy, but also tends to reduce the computational demand at the server.

When at 250 a user context preference matches a successful context rule, at 260 the notification message is prepared, or rendered, for presentation to the user. Rendering information may be contained in the associated context rule of the notification message, and may include a number of times to replay a message and an expiry date, for example. At 265, the prepared notification message is presented for the user to view. However, if at 250, a user context preference does not match a successful context rule, at 255 the removal from the target mobile device 127 (FIG. 1), or expiry, of the notification message is handled. For example, if the successful context rule does not match a user context preference, but has a date range, the notification message may be retained on the target mobile device 127 for the duration of the date range rather than deleted, even though the user context preference is not satisfied on this day. The context evaluator 320 (FIG. 3) may re-evaluate the user context preference against the contextual condition each day during the date range until the date range is exhausted.

In operation, for example, a department store may create a notification message for a promotional sale. The notification message should be presented to the user on the target mobile device 127 (FIG. 1) for a consecutive number of days when the conditional context of the target mobile device 127 (FIG. 1) indicates proximity to the department store. After the number of days has elapsed, the notification message should be deleted from the target mobile device 127 (FIG. 1). In this example, whether the user sees the notification message depends on whether the user satisfies the proximity context rule. Although the user may see the notification message every day, some days, or not at all, the department store only needs to create and dispatch the notification message once, accompanied by appropriate context rules.

Figure 4:
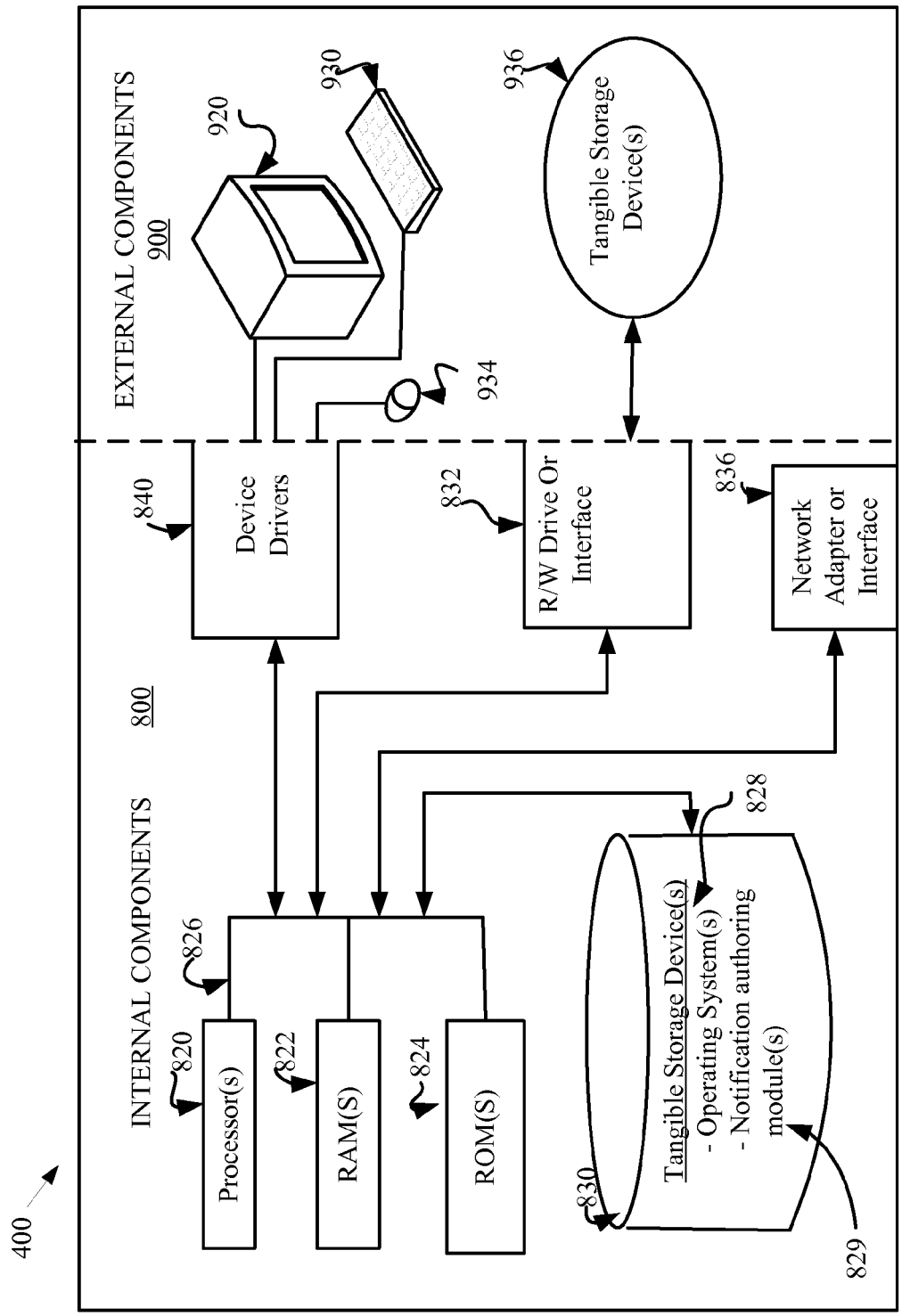
FIG. 4 is a schematic block diagram of hardware and software of the computer environment according to an embodiment of the method of FIG. 2.

Referring now to FIG. 4, computing device 400 may include respective sets of internal components 800 and external components 900 that together may provide an environment for a software application, such as a Push Notification Service (FIG. 1). Each of the sets of internal components 800 includes one or more processors 820; one or more computer-readable RAMs 822; one or more computer-readable ROMs 824 on one or more buses 826; one or more operating systems 828; one or more software applications (e.g., notification message authoring modules 829) executing the method 200; and one or more computer-readable tangible storage devices 830. The one or more operating systems 828 and notification message authoring modules 829 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The CM modules and DBMS modules 829, and operating system 828 that are associated with computing device 400, can be downloaded to computing device 300 from an external computer (e.g., server) via a network (for example, the Internet, a local area network, or other wide area network) and respective network adapters or interfaces 836. From the network adapters (or switch port adapters) or interfaces 836 and operating system 828 associated with computing device 400 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1-4 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for a contextual push notification service, comprising:
   a non-transitory computer readable storage medium readable by a processing circuit and storing instructions for execution by the processing circuit for performing a method comprising:
   receiving, by a mobile device, a notification message comprising:
      at least one context rule and
      a notification message;
   comparing, at the mobile device, the received at least one context rule with at least one user context preference wherein comparing comprises:
      gathering sensor data from at least one sensor on the mobile device, based on the received context rule;
      determining a contextual condition of the mobile device, based on the gathered sensor data; and
      comparing the determined contextual condition of the mobile device with the at least one user context preference; and
   taking a notification action, at the mobile device, based on the comparing of the received at least one context rule with the at least one user context preference and based on the determined contextual condition of the mobile device matching the at least one user context preference.

2. The computer program product of claim 1, wherein the receiving the notification message further comprises:
   inputting the received notification message to a notification agent on the mobile device;
   extracting the at least one context rule from the received notification message; and
   extracting the at least one user context preference from notification agent storage.

3. The computer program product of claim 1, wherein the notification action comprises at least one of:
   rejecting the received notification message;
   delaying the received notification message; and
   replaying the received notification message one or more times.

4. The computer program product of claim 1, wherein the mobile device comprises at least one of:
   a mobile phone;
   a personal digital assistant; and
   a tablet computer.

5. The computer program product of claim 1, wherein the user of the mobile device manages the at least one user context preference on the mobile device.

6. The computer program product of claim 1, wherein the mobile device comprises a device configured to run a mobile application.

7. A computer system for a contextual push notification service comprising one or more processors, one or more computer-readable storage devices, and a plurality of program instructions stored on at least one of the one or more computer-readable storage devices for execution by at least one of the one or more processors, the plurality of program instructions comprising:
   at least one of the computer-readable storage devices readable by a processing circuit and storing instructions for execution by the processing circuit for performing a method comprising:
   receiving, by a mobile device, a notification message comprising:
      at least one context rule and
      a notification message;
   comparing, at the mobile device, the received at least one context rule with at least one user context preference wherein comparing comprises:
      gathering sensor data from at least one sensor on the mobile device, based on the received context rule;
      determining a contextual condition of the mobile device, based on the gathered sensor data; and
      comparing the determined contextual condition of the mobile device with the at least one user context preference; and
   taking a notification action, at the mobile device, based on the comparing of the received at least one context rule with the at least one user context preference and based on the determined contextual condition of the mobile device matching the at least one user context preference.

8. The computer system of claim 7, wherein the receiving the notification message further comprises:
   inputting the received notification message to a notification agent on the mobile device;
   extracting the at least one context rule from the received notification message; and extracting the at least one user context preference from notification agent storage.

9. The computer system of claim 7, wherein the notification action comprises at least one of:
rejecting the received notification message;
delaying the received notification message; and
replaying the received notification message one or more times.

10. The computer system of claim 7, wherein the mobile device comprises at least one of:
a mobile phone;
a personal digital assistant; and
a tablet computer.

11. The computer system of claim 7, wherein the user of the mobile device manages the at least one user context preference on the mobile device.

12. The computer system of claim 7, wherein the mobile device comprises a device configured to run a mobile application.

* * * * *